United States Patent [19]

Ahrgal

[11] Patent Number: 4,826,137

[45] Date of Patent: May 2, 1989

[54] BRUSH AND SMALL TREE REMOVER

[76] Inventor: Wayne J. Ahrgal, 24190 S.W. 142nd Ave., Princeton, Fla. 33032

[21] Appl. No.: 153,219

[22] Filed: Feb. 8, 1988

[51] Int. Cl.$^4$ .............................................. B66F 3/00
[52] U.S. Cl. ................................... 254/132; 254/131
[58] Field of Search .............. 254/29 R, 30, 120, 129, 254/131, 132, 133 R

[56] References Cited

U.S. PATENT DOCUMENTS

| 959,377 | 5/1910 | O'Donnell | 254/132 |
| 1,260,041 | 3/1918 | Powell | 254/132 |
| 1,261,600 | 4/1918 | Olson | 254/132 |
| 1,393,955 | 10/1921 | Monk | 254/132 |
| 1,724,026 | 4/1927 | Joseph | 254/132 |
| 2,846,259 | 8/1958 | Sadler | 254/131 |
| 3,991,976 | 11/1976 | Skinner | 254/30 |

FOREIGN PATENT DOCUMENTS 492180  4/1953  Canada .............................. 254/132

Primary Examiner—Frederick R. Schmidt
Assistant Examiner—Judy J. Hartman
Attorney, Agent, or Firm—Oltman and Flynn

[57] ABSTRACT

According to the invention there is provided a tree remover which has a relatively long lever in the form of a beam or rod, and has a hole near one end of the lever. A chain having a hook at each end is threaded through the hole. One of the hooks, the slip hook, is looped around the tree trunk or the bottom part of the bush in one or two turns of the chain, and the lever is placed with the end opposite the hole against the ground a given short distance from the root of the tree or bush. The other end of the chain is then locked with the grab hook against the lever, and a substantially horizontal force is applied to the lever. The horizontal force is converted to a significantly greater, substantially vertical, leveraged force for pulling the tree or bush upward and out of the ground.

5 Claims, 1 Drawing Sheet

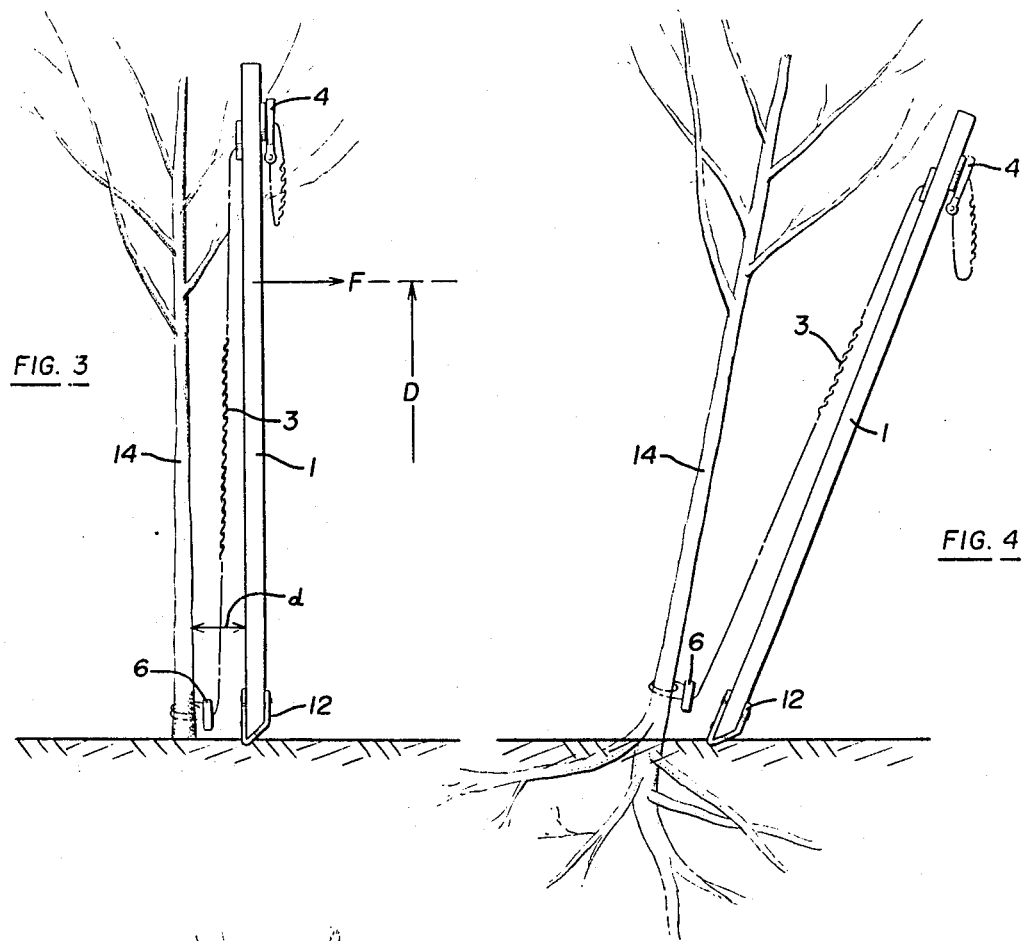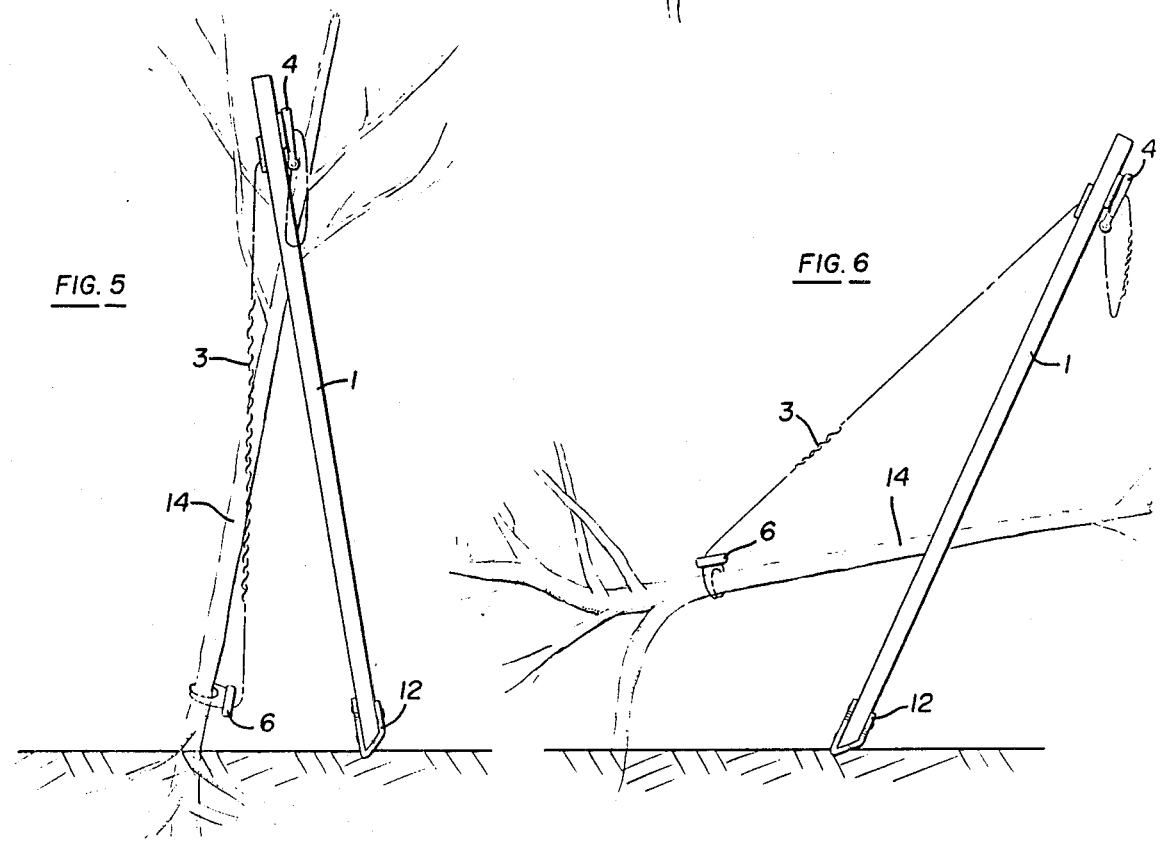

BRUSH AND SMALL TREE REMOVER

The invention relates to apparatus for removing small trees and bushes, and more particularly to a remover having a level and a chain threaded through a hole in the lever, with a hook at each end.

BACKGROUND AND PRIOR ART

There is oftentimes a need for apparatus to assist in removing small trees and bushes from areas where it is difficult to find a place for space-consuming and heavy pulling type devices, and where the trees and bushes are too large to be removed by hand alone or where extensive digging and root-cutting is required in order to free the tree or bush.

Inventors have in the past shown devices of various types that serve to provide additional force for removing small trees and bushes. U.S. Pat. No. 1,261,600 shows a fence post puller that uses a horizontal lever with a fulcrum attached to a ground support and has a short arm connected to a chain wrapped around the fence post for pulling up the post with leveraged force applied to the long arm. Said known device, however, has the disadvantage that it uses a horizontal space-consuming lever for which there is not always room if the tree to be pulled is located in a tight area, and has the further disadvantage that several heavy parts are required.

Other devices are known in the prior art which have the drawbacks of being either cumbersome to use and/or bulky and heavy to transport; being less mobile and more time consuming to set up, adjust and use; having a narrower range of leverages available and having a narrower range of adjustment; and not being readily able to "work" a plant, i.e. to change the amount of pressure of pull and to change the direction of the pull. At least one prior art device, Miller, Canadian Pat. No. 492,180, teaches that engagement with the item to be pulled is necessary at a plurality of locations.

SUMMARY OF THE INVENTION

It is the object of the instant invention to overcome the drawbacks of the prior art devices and provide apparatus for removing small trees and bushes by means of very simple and inexpensive implements, that are readily movable and that can be used in tight spaces where it is difficult to bring in large and heavy equipment.

According to the invention there is provided a free standing tree remover which has a relatively long lever in the form of a beam or rod, and has a hole near one end of the lever. A chain having a hook at each end is threaded through the hole. One of the hooks, the slip hook, is looped around the tree trunk or the bottom part of the bush in one or two turns of the chain, and the lever is placed with the end opposite the hole against the ground a given short distance from the root of the tree or bush. The tree or bush need only be contacted near its root, the foliage therebove being irrelevant to advantageous operation of the invention. The other end of the chain is then locked with the grab hook against the lever, and a substantially horizontal force is applied to the lever. The horizontal force is converted to a significantly greater, substantially vertical, leveraged force for pulling the tree or bush upward and out of the ground.

In accordance with another feature, the lever is made of a relatively light material, such as wood or the like, and has at least one backing plate with a hole therein attached to one side of the lever with its hole in alignment with the hole in the lever for reinforcing the material surrounding the hole in the lever.

In accordance with still another feature, the grab hook has a slot therein that fits in the space between two chain links so that the chain can be received in that slot for locking the chain in a position wherein it is prevented from sliding through the hole when a pulling force is applied to the lever.

In accordance with a still further feature, the lever has a wedge-shaped bottom end so that the fulcrum may be placed as close as possible to the bole of the plant being uprooted so that the highest possible leverage is obtained for the initial effort.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 3 is an elevational view of the invention showing the lever is position to pull a small tree.

FIG. 4 is a view of the invention according to FIG. 3 showing the initial pulling of the tree.

FIG. 5 is a view according to FIG. 3 showing a second pull.

FIG. 6 is a view according to FIG. 3 showing a completed pull.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DESCRIPTION OF THE PREFERRED EMBODIMENTS

Figure 1:
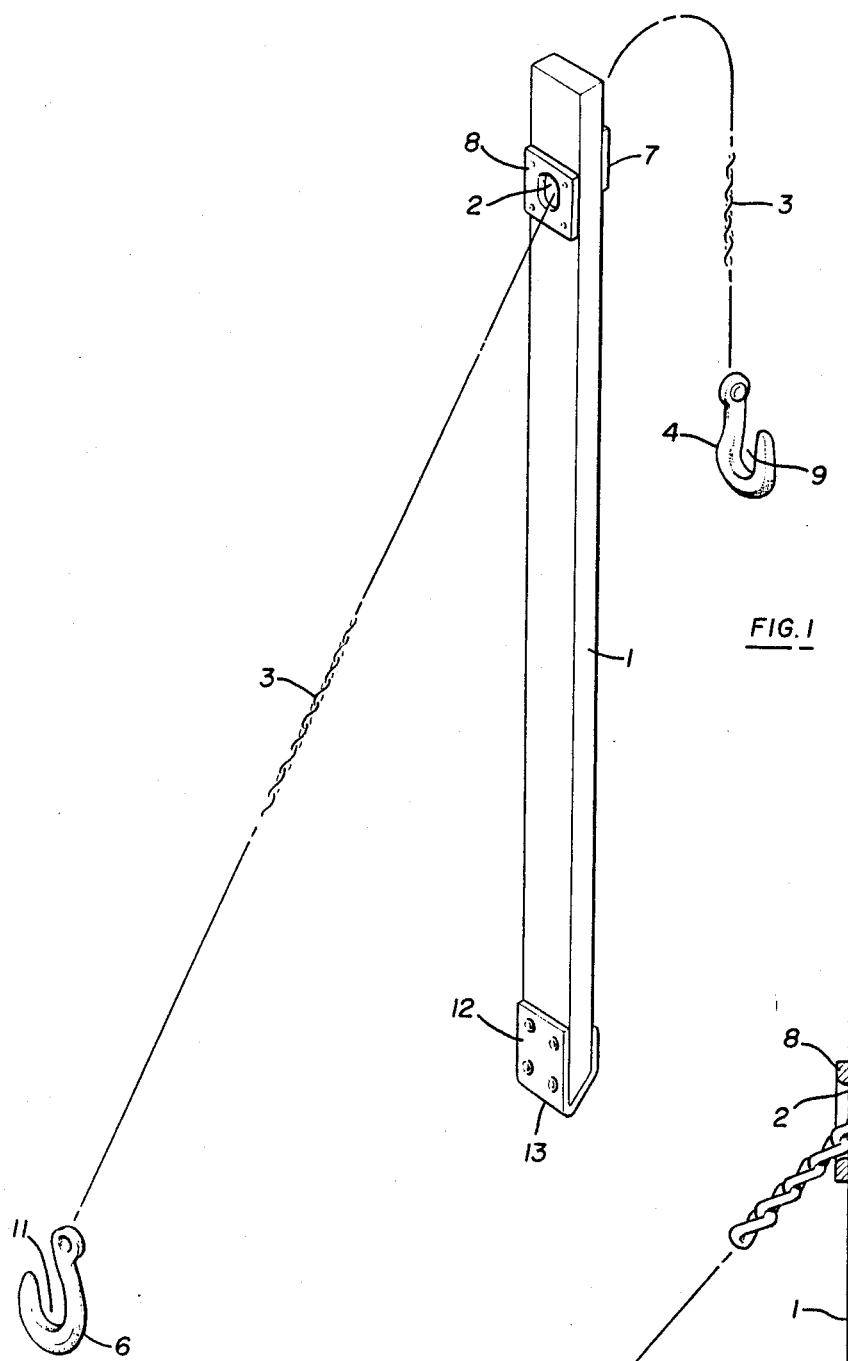
FIG. 1 is an elevational perspective view of the invention showing its basic construction.

FIG. 1 shows the basic construction of the device according to the invention. It has a lever 1 shown in vertical position, having a hole 2 through the lever near the upper end of the lever. A chain 3 has a grab hook 4 attached to one end of the chain and a slip hook 6 attached to the other end of the chain. Two backing plates 7 and 8, each having a hole therethrough are attached to opposite sides of the lever 1 in alignment with the hole 2 in the lever. The chain is threaded through the hole in the lever and in the two backing plates 7 and 8.

The grab hook 4 has a slot 9 therein which has a width such that it can receive the chain therein but not so wide that the chain can slide through the slot.

The slip hook 6 has a wider slot 11 therein that is wide enough that the chain can slide therethrough.

Figure 2:
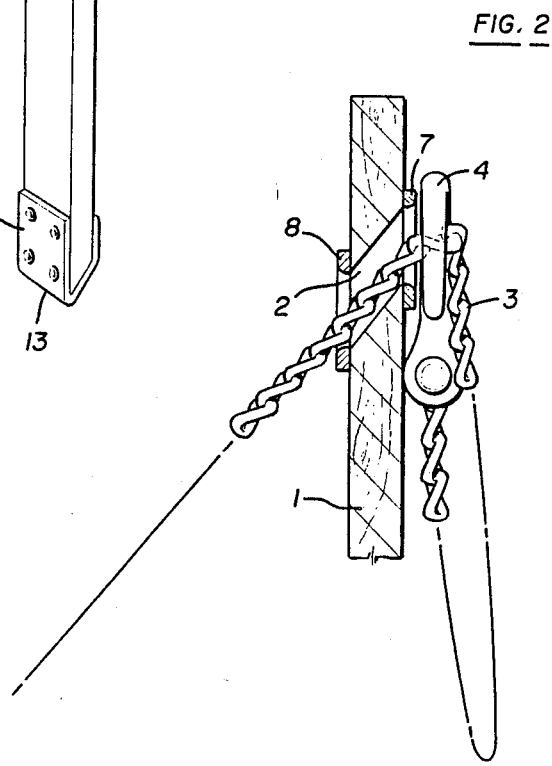
FIG. 2 is a cross-sectional fragmentary enlarged detail view of the invention showing the locking of the chain by means of one of the hooks.

FIG. 2 shows a cross section of the upper end of the lever 1 with the chain 3 threaded through the hole 2. The chain is shown in locked position with the grab hook 4 hung over the chain with one link inserted into the slot 9 so that the chain is prevented from sliding through the hole 2 in downward direction away from the side having the chain locked.

The lever 1 is advantageously made of wood or other light material. It need not have great bending strength since in its use it is exposed only to a longitudinal compression force, i.e. as a column. It has been found that a two by four inch (2×4) piece of lumber is typically strong enough to remove most small trees. The two backing plates 7 and 8 are typically of metal and serve to protect the material of the lever 1, surrounding the hole 2, from becoming frayed and worn as the chain is pulling against the sides of the hole 2. The hole 2 may advantageously be slanted downward from the side facing the grab hook 4 toward the side facing the slip hook 8 which makes the chain 3 slide more smoothly through the hole 2.

The lower end of the lever 1 has a wedge-shaped edge 13 so that the fulcrum may be placed as close as possible to the trunk of the plant being moved to gain the maximum leverage for the initial thrust.

A metal plate reinforcement 12 may advantageously be attached to the bottom end of the lever 1 to protect that end from becoming frayed and worn during heavy use.

FIGS. 3–6 show the operation of the invention. In FIG. 3 the lever 1 is placed vertically a short distance d from the trunk 14 of a small tree with the bottom end of the chain with the slip hook 6 looped once or twice around the tree trunk near the ground. It will be seen that the lever 1 stands free of the tree. In this position the chain 3 leads upward and through the hole 2 in the lever 1. The chain 3 is locked at its upper end by the grab hook 4 being hung over the chain. Next, a force F is being applied to the lever 1 in a direction away from the tree at a point a certain distance D above the ground. As a result, a considerable upward force is applied to the tree trunk 14 by the nearly vertical part of the chain 3, as a result of the leverage factor D/d applied to the force F. FIG. 4 shows the tree pulled partially out of the ground. A second pull can now be applied by tightening the chain 3 and again locking it, as shown in FIG. 5, possibly resulting in the tree being pulled completely out of the ground as seen in FIG. 6, or three or more pulls can be applied as required until the tree is completely out of the ground.

It follows that almost any amount of upward-directed force can be applied to the tree trunk by making the distance d sufficiently small, thereby increasing the leverage factor D/d, and increasing the number of pulls as required. As mentioned above, the lever 1 is stressed only in the longitudinal direction and can therefore withstand a considerable amount of compression force, since it is used as a column and not as a cantilevered lever.

I claim:

1. A free standing tree remover comprising a compression lever having a hole at one end, a chain threaded through the hole, a slip hook attached to one end of the chain for attachment to the tree to be pulled, at least one backing plate having a hole therein aligned with the hole in the compression lever, attached to at least one side of the compression lever for reinforcing the material of the lever surrounding said hole, and means for locking any one of the chain links against the compression lever to vary the effective chain length, whereby a substantially horizontal force can be applied to the compression lever, said force being converted to a leveraged, substantially vertical, almost infinitely variable force on said tree for pulling the tree upward from the ground.

2. A tree remover according to claim 1 having two backing plates attached to respective opposite sides of said compression lever, aligned with said hole.

3. A tree remover according to claim 1 wherein said means for locking the chain is a grab hook, which has a slot that fits in the space between adjacent links of the chain for locking the chain against said compression lever.

4. A tree remover according to claim 1 including a bottom plate attached to the end of the lever opposite the end having a hole.

5. A tree remover according to claim 1 wherein the end of the lever opposite the end having a hole is wedge shaped, and has a downwardly facing edge.

* * * * *